United States Patent
Muller et al.

(10) Patent No.: US 7,650,756 B2
(45) Date of Patent: Jan. 26, 2010

(54) DEVICE AND METHOD FOR GENERATING THERMAL UNITS WITH MAGNETOCALORIC MATERIAL

(75) Inventors: Christian Muller, Strasbourg (FR); Jean-Louis Dupin, Muntzenheim (FR); Jean-Claude Heitzler, Horbourg-Wihr (FR)

(73) Assignee: Cooltech Applications, Andolsheim (FR)

( * ) Notice: Subject to any disclaimer, the term of this patent is extended or adjusted under 35 U.S.C. 154(b) by 461 days.

(21) Appl. No.: 11/578,855

(22) PCT Filed: Apr. 21, 2005

(86) PCT No.: PCT/IB2005/001059

§ 371 (c)(1),
(2), (4) Date: Oct. 19, 2006

(87) PCT Pub. No.: WO2005/103585

PCT Pub. Date: Nov. 3, 2005

(65) Prior Publication Data

US 2009/0025398 A1 Jan. 29, 2009

(30) Foreign Application Priority Data

Apr. 23, 2004 (FR) .................................. 04 04306

(51) Int. Cl.
*F25B 21/00* (2006.01)
(52) U.S. Cl. ........................................................ 62/3.1
(58) Field of Classification Search ...................... 62/3.1
See application file for complete search history.

(56) References Cited

U.S. PATENT DOCUMENTS

| | | | | | |
|---|---|---|---|---|---|
| 3,638,440 | A | * | 2/1972 | Lawless | 62/3.1 |
| 3,841,107 | A | * | 10/1974 | Clark | 62/3.1 |
| 5,357,756 | A | * | 10/1994 | Lubell | 62/3.1 |
| 5,934,078 | A | * | 8/1999 | Lawton et al. | 62/3.1 |
| 6,595,004 | B1 | * | 7/2003 | Ghoshal | 62/3.1 |
| 6,826,915 | B2 | * | 12/2004 | Wada et al. | 62/3.1 |
| 2002/0040583 | A1 | * | 4/2002 | Barclay et al. | 62/3.1 |

FOREIGN PATENT DOCUMENTS

EP 0 104 713 4/1984
FR 2 574 913 6/1986

OTHER PUBLICATIONS

Yu B F et al: "Review on research of room temperature magnetic refrigeration" International Journal of Refrigeration, Oxford, GB, vol. 26, No. 6, Sep. 2003, pp. 622-636, XP004436370 ISSN: 0140-7007.

* cited by examiner

*Primary Examiner*—William C Doerrler
(74) *Attorney, Agent, or Firm*—Davis & Bujold, P.L.L.C.

(57) ABSTRACT

The present invention concerns a device for generating thermal units using magnetocaloric material, with low energy consumption, evolutive, of a simple design, reliable operation, which allows to generate thermal units in a cost effective way while at the same time removing the risks of thermal fluid leakage and limiting the number of mechanical parts. The device (1a) for generating thermal units using magnetocaloric material comprises a magnetic element (2a) coupled to a power supply (3a), a magnetocaloric element (4a), a circuit (5) for thermal exchange fluid in which one or more thermal exchange fluids are made to circulate by means of circulation (6), and two heat exchangers (7, 8). The power supply (3a) is set up to generate electric pulses so as to create an impulsive magnetic field that causes the heating and the cooling of the magnetocaloric element (4a) and hence of the thermal exchange fluid.

22 Claims, 9 Drawing Sheets

DEVICE AND METHOD FOR GENERATING THERMAL UNITS WITH MAGNETOCALORIC MATERIAL

This application is a national stage completion of PCT/IB2005/001059 filed Apr. 21, 2005 which claims priority from French Application Ser. No. 04/04306 filed Apr. 23, 2004.

TECHNICAL FIELD

The present invention concerns a device for generating thermal units with magnetocaloric material that comprises at least one magnetic element intended to generate a magnetic field, at least one magnetocaloric element intended to be alternatively subjected to the said magnetic field to generate calories and frigories, at least one circuit for thermal exchange fluid of which at least a portion is placed in the immediate vicinity of the magnetocaloric element so as to recover at least part of the calories and/or frigories that it emits, the said circuit being coupled to means of circulation of the thermal exchange fluid and to at least one heat exchanger set up to transfer at least part of the calories and/or frigories recovered by the said thermal exchange fluid. The invention also concerns a method for the generation of thermal units using the said device.

PRIOR ART

It is known that thermal generators with magnetocaloric material comprise fixed magnetic means and mobile magnetocaloric elements coupled to means of displacement, or inversely. Thus, the magnetocaloric elements are alternatively subjected to the presence and absence of a magnetic field and alternatively generate calories and frigories. These thermal units are recovered by thermal exchange fluids that travel through the magnetocaloric elements and connected to "hot" and "cold" circuits that comprise heat exchangers to heat and/or cool and/or regulate and/or air-condition for example an ambient environment, a chamber, a room, the inside of a container.

In the case where the magnetocaloric elements are mobile in relation to the magnetic means, it is very difficult to guarantee a good tightness between the sections that run through the magnetocaloric elements and the "hot" and "cold" circuits and leaks are frequent.

The magnetic means generally comprise a magnetic assembly, a permanent magnet, an electromagnet, a superconductive magnet, a superconductive electromagnet, a superconductor. Permanent magnets do not allow to obtain satisfactory results in terms of magnetic power. In relation to this criterion, the best results are obtained with electromagnets and superconductive electromagnets. Unfortunately, electromagnets require very significant amounts of electrical energy, which makes them costly to use. Moreover, they heat up quickly and evacuating their calories complicates the construction of thermal generators. Moreover, the technology of superconductive electromagnets is very costly.

In addition, the use of electromagnets allows to vary their magnetic field by feeding them with a variable electrical current. This solution has the advantage of removing any relative movement between the magnetocaloric elements and the magnetic means. The publications FR-A-2 574 913, EP-A-0 104 713 and U.S. Pat. No. 6,595,004 describe examples of variable current power supply, although some of them are limited to superconductive electromagnets that are not compatible with the present invention. Likewise, variable current power supply does not allow to obtain satisfactory results in terms of energy consumption and cost. Hence the existing solutions are not satisfactory.

DESCRIPTION OF THE INVENTION

The present invention aims to overcome these disadvantages by offering a device for the generation of thermal units using magnetocaloric material with low energy consumption, which is evolutive, of a simple design, reliable operation, and which allows to generate thermal units in a cost effective way while at the same time removing the risks of thermal fluid leakage and limiting the number of mechanical parts.

With this aim, the invention concerns a device for the generation of thermal units of the kind described in preamble, characterized in that the magnetic element is an electromagnet coupled to at least one power supply controlled by at least one control unit set up to generate electric pulses so as to create an impulsive magnetic field, in which electric pulses of intensity I, duration t and frequency T are triggered as a function of at least one predetermined pulse parameter, the said device comprising at least one thermal sensor set up to determine the temperature of the said thermal exchange fluid, the said fluid temperature defining at least one pulse parameter.

The means of recovery preferably comprise at least two heat exchangers connected to the circuit serially, in parallel or as a serial/parallel combination.

Preferably, the means of recovery comprise at least one heat exchanger for calories set up to transfer the calories and at least one heat exchanger for frigories set up to transfer the frigories, the said heat exchangers being coupled to means of commutation controlled by a control unit set up to successively connect each heat exchanger to the magnetocaloric element as a function of at least one predetermined commutation parameter.

The control unit can be set up so that the frequency T ranges between 60 seconds and $1/150^{th}$ of a second and with a value preferably lower than 2 seconds.

The control unit can also be set up so that the T/t ratio ranges between 10 and 100,000, and with a value preferably higher than 1,000.

Finally, the control unit can be set up so that the intensity I generates a magnetic field in the magnetic element, which ranges between 0.05 Tesla and 10 Teslas, and with a value preferably higher than 2 Teslas.

According to a preferred embodiment, the control unit comprises adjusting means for at least one of the electric pulse parameters selected within the group that includes the duration t, the frequency T, the intensity I.

According to a preferred embodiment, the control unit comprises timing means set up to determine the time interval elapsed since the commutation and/or the preceding electric pulse, said time interval defining at least one commutation and/or pulse parameter.

For this purpose, the control unit may comprise means of adjustment for the predetermined commutation and/or pulse parameter.

The means of recovery advantageously comprise at least one "mixed" exchanger set up to transfer the calories and frigories in the ambient environment for example.

The device preferably comprises at least two magnetocaloric elements interconnected serially, in parallel or as a serial/parallel combination, the said magnetocaloric elements having potentially different magnetocaloric characteristics.

Advantageously, the device comprises at least two electromagnets, each one associated to a magnetocaloric element and at least two power supplies set up to separately feed the electromagnets electrically.

Preferably, the core of the said electromagnet is made of a high remanence magnetic material.

The magnetic element and the magnetocaloric element are preferably fixed in relation to one another.

The invention also concerns a method for the generation of thermal units during which the device described previously is used.

During this method, it is possible to use at least two magnetocaloric elements, each one associated to an electromagnet, and at least two power supplies, and, in successive phases, to use a first magnetocaloric element on its own then a first and a second magnetocaloric elements simultaneously and finally the second magnetocaloric element on its own so as to combine the magnetocaloric properties of the first and second magnetocaloric elements.

BRIEF DESCRIPTION OF THE DRAWINGS

The present invention and its advantages will be more clearly explained in the following description of several embodiments in reference to the annexed drawings given as non limiting examples, in which.

ILLUSTRATIONS OF THE INVENTION

For reasons of simplification, the terms "device" and "method" will be used to replace the terms "device for generating thermal units using magnetocaloric material" and "method for generating thermal units using magnetocaloric material".

Additionally, the term "heat exchanger" represents any means allowing the transfer and/or diffusion of calories and/or frigories.

Figure 1:
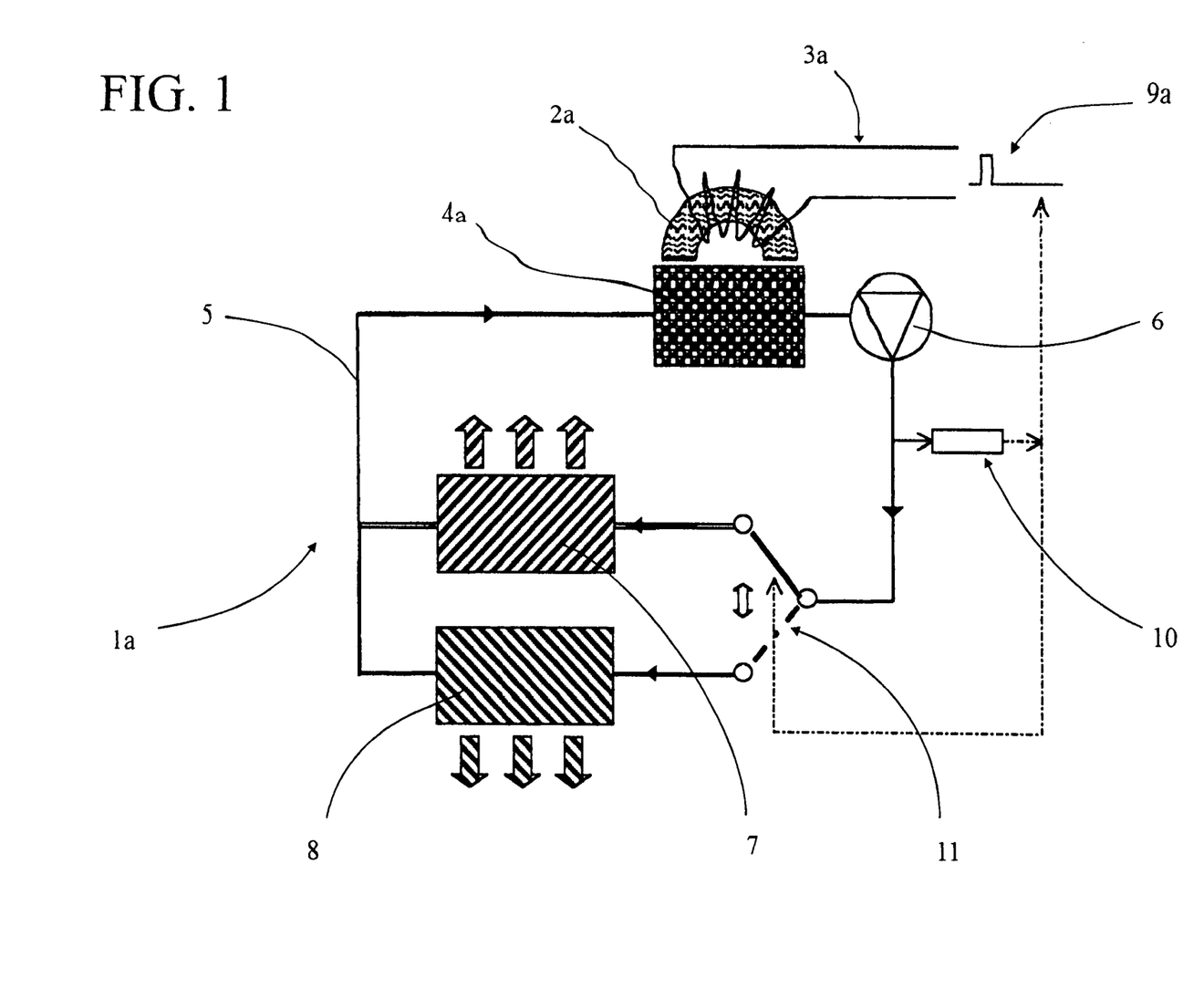
FIG. 1 is a schematic view of the device according to the invention.

In reference to FIG. 1, the device $1a$ comprises a magnetic element $2a$ coupled to a power supply $3a$, a magnetocaloric element $4a$, a circuit for thermal exchange fluid 5 in which one or more thermal exchange fluids are made to circulate by circulation means 6, and two heat exchangers 7, 8.

The magnetocaloric element $4a$ contains a magnetocaloric material such as for example gadolinium (Gd), a gadolinium alloy comprising silicon (Si), germanium (Ge), iron (Fe), magnesium (Mg), phosphorus (P), arsenic (As) or any other equivalent material. This magnetocaloric material takes for example the form of a block, pellets, powder, agglomerate, fragments.

The magnetocaloric characteristics of the magnetocaloric element $4a$ are as follows:

when it is subjected to the presence of a magnetic field, the magnetocaloric element $4a$ heats up under the magnetocaloric heating effect, and, when the magnetic field disappears or decreases, the magnetocaloric element $4a$ continues to heat up under the effect of magnetocaloric inertia, and, after dissipation of this magnetocaloric inertia, the magnetocaloric element $4a$ cools to a temperature lower than its initial temperature under the magnetocaloric cooling effect.

The principle of operation of the device thus consists in subjecting the magnetocaloric element $4a$ to a variation of magnetic field to generate calories and frigories used to heat, cool, air-condition, regulate, a chamber, an ambient environment, etc.

In order to do this, an electromagnet $2a$ is used as magnetic element, and is placed in close proximity to the magnetocaloric element $4a$ so that it is subjected to the magnetic field. The electromagnet $2a$ is fed electrically using a power supply $3a$ that generates an impulsive electrical current so as to obtain a modification of the magnetic field. The magnetocaloric element $4a$ thus subjected to an impulsive magnetic field generates calories and frigories. One will preferably but not exclusively select an electromagnet $2a$ whose magnetic core is made of a high remanence magnetic material, such as iron cobalt alloys, rare earth metals, ferrites, iron and silicon alloys, iron, nickel for example.

These calories and frigories are recovered by the thermal exchange fluid that circulates in the portion of the circuit 5 of thermal exchange fluid located in the immediate vicinity of the magnetocaloric element $4a$. For example this portion runs through the magnetocaloric element $4a$. Circuit 5 is made traditionally using for example an assembly of pipes or any other appropriate means. Circuit 5 comprises circulation means 6 for the thermal exchange fluid such as a pump for example or any other equivalent means.

In this example, the power supply $3a$ is controlled by a control unit 20 (see FIG. 7) that generates successive electric pulses $9a$ of intensity I, duration t, at a frequency T, these characteristics can be adjusted.

These electric pulses $9a$ are generated as a function of one or several predetermined pulse parameters, for example as a function of the temperature of the thermal exchange fluid and/or the time interval elapsed since the preceding pulse $9a$. For this purpose, the device $1a$ comprises a thermal sensor 10 and/or timing means (not represented).

The thermal sensor 10 allows to determine the temperature of the thermal exchange fluid, for example at the exit of the magnetocaloric element $4a$. This determination is carried out as an absolute value, for example by a measurement in degrees, by detection of a temperature threshold or, as a relative value, by comparison, for example in degrees with another temperature. The temperature determined is compared with a predetermined temperature set point. When the temperature set point is reached, the electric pulse $9a$ is generated.

The timing means allow to determine the time interval elapsed since the preceding electric pulse $9a$ for example and to compare it with a predetermined time set point. When the time set point is reached, the electric pulse $9a$ is generated. The timing means can be for example electronic circuits, pneumatic circuits, a combination of electronic and pneumatic circuits or any other known means.

In this example, the device $1a$ comprises a calories exchanger 7 to transfer the calories and a frigories exchanger 8 to transfer the frigories. These heat exchangers 7, 8 are connected in parallel to the thermal exchange fluid circuit 5 via means of commutation 11 controlled by a control unit, which can be the same one as that which controls the power supply 3a, and which allows to successively connect each heat exchanger 7, 8 to the magnetocaloric element 4a.

This commutation is performed as a function of one or several predetermined commutation parameters, for example as a function of the time interval elapsed since the electric pulse 9a and/or since the preceding commutation and/or according to the temperature of the thermal exchange fluid. For this purpose, the control unit comprises timing means and/or a thermal sensor 10.

The timing means and/or the thermal sensor 10 can be the same ones as the previous ones. When the time set point and/or the temperature set point is reached, the means of commutation 11 make the magnetocaloric element 4a communicate with one heat exchanger 7 then with the other 8. These means of commutation 11 comprise for example a valve, a slide with electric, pneumatic or hydraulic drive, a switch or any other appropriate means.

It is quite obvious that the control unit 20 can comprise several thermal sensors 10 and/or several timing means and/or use a different pulse and/or commutation parameter.

Figure 7:
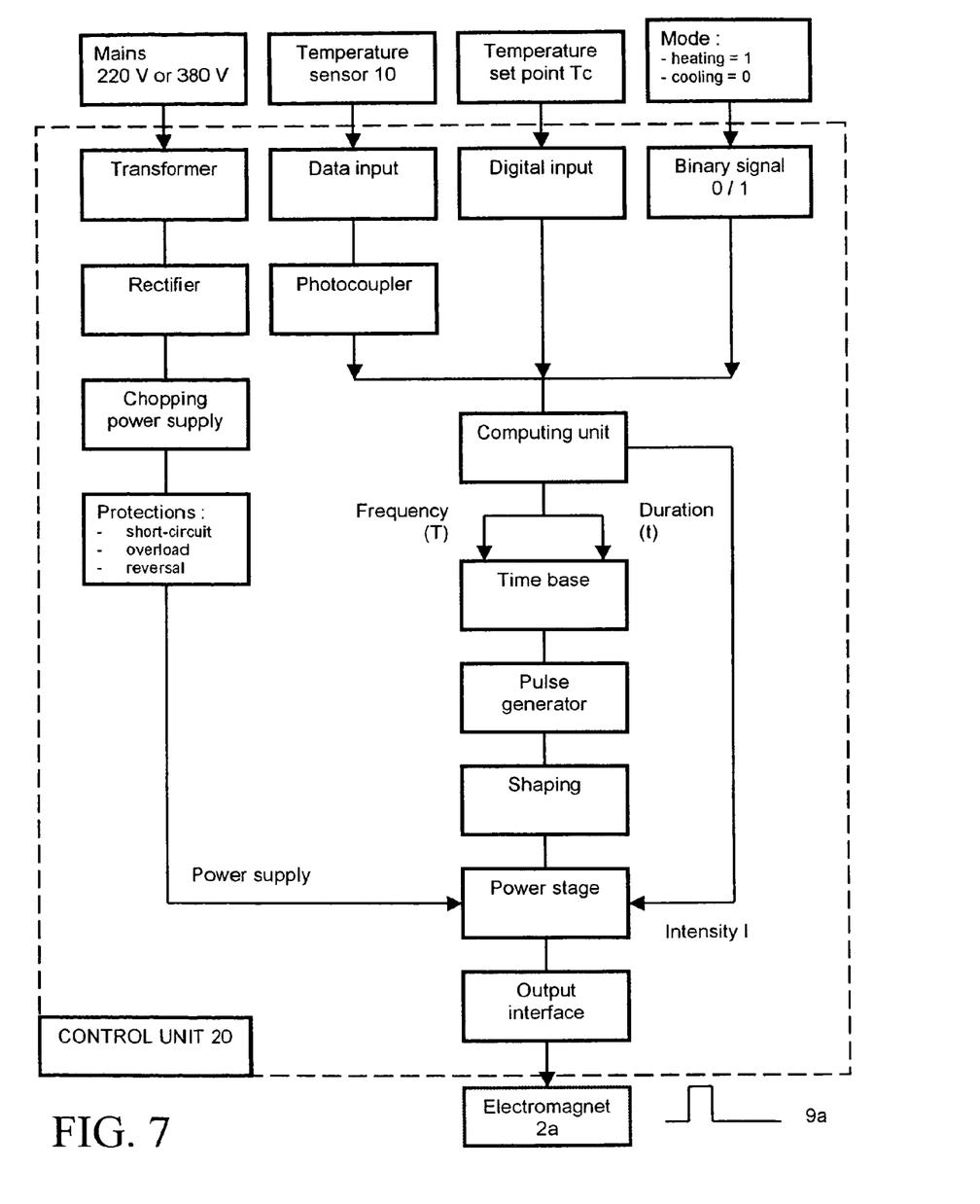
FIG. 7 is a diagram of the control unit of the device according to the invention.

The control unit 20 represented on FIG. 7 is given as a non limiting example. It comprises a power stage fed with the mains at 220 or 380 V through a transformer followed by a rectifier, a chopper power supply and protections against short-circuits, overloads and phase reversals. It also comprises a computing unit controlled by at least three data: the temperature of the thermal exchange fluid measured by the temperature sensor 10, a temperature set point Tc and the operating mode either as heating mode, or as cooling mode. This computing unit generates three data: the duration t of the electric pulses and their frequency T as well as their intensity I. The intensity I feeds the power stage while the duration t and frequency T feed a time base coupled to an electric pulse generator for example of the type with transistors, triacs, thyristors, lamp, induction, discharge, current blocking and preferentially an electric power pulse generator with transistors. The electric pulses 9a generated are transmitted to the power stage via a shaping module, before feeding the electromagnet 2a through an output interface. The various modules that come into this control unit 20 are not detailed since they form part of the standard knowledge of an electronics engineer.

Figure 2A:
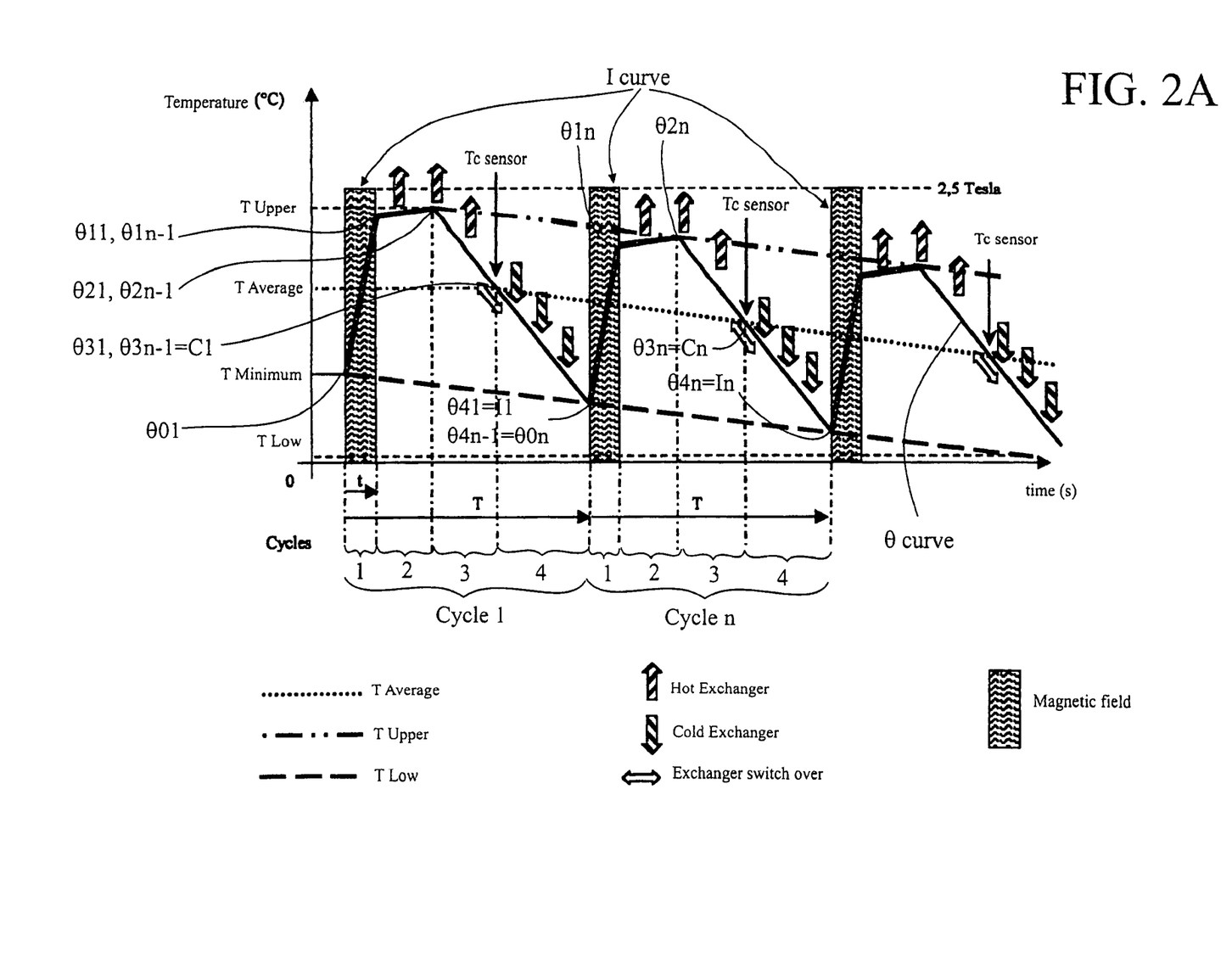
FIGS. 2A and 2B are curves illustrating the operation of the device represented on FIG. 1 according to the heating and cooling modes respectively.
Figure 2B:
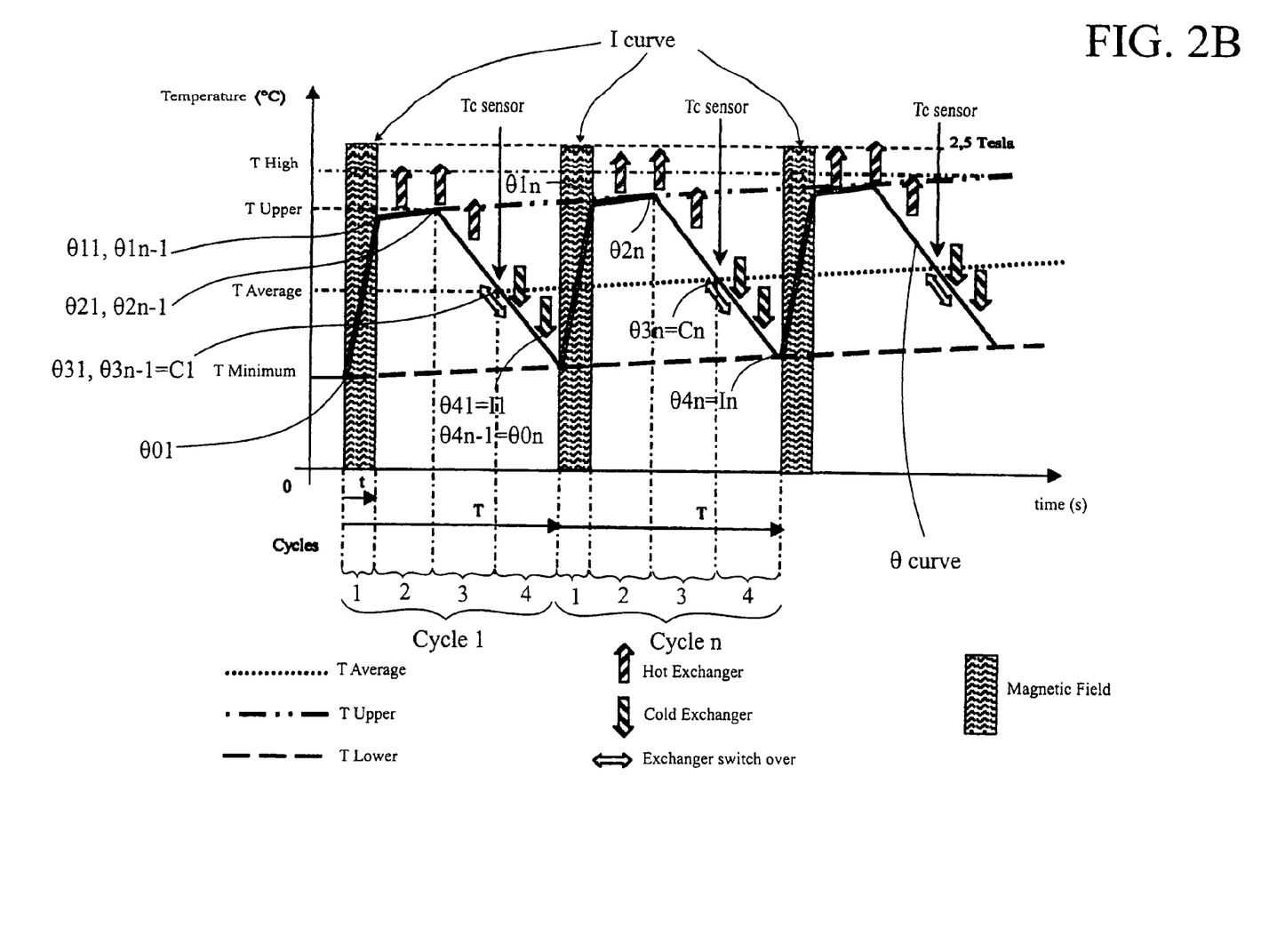

The method that uses this device 1a is described in reference to the pulse curve "Curve I" and temperature curve "Curve θ" of the thermal exchange fluid illustrated by FIGS. 2A and 2B, respectively according to "cooling" and "heating" modes.

In the "cooling" mode illustrated by the curves on FIG. 2A, the process breaks up into several successive cycles that each includes several successive stages.

Cycle 1 (Startup):

Preparation: The commutation means 11 are positioned so that the magnetocaloric element 4a is connected to the calories exchanger 7.

Startup:

The electromagnet 2a is supplied with an electric pulse 9a of intensity I, which generates in the electromagnet 2a a magnetic field that ranges between 0.05 Tesla and 10 Teslas, and with a value preferably higher than 2 Teslas, of duration t that ranges between $10^{-9}$ second and 60 seconds and with a value preferably lower than $10^{-2}$ second.

Stage 1—Cycle 1:

During the electric pulse 9a, the electromagnet 2a generates a magnetic field.

The magnetocaloric element 4a subjected to this magnetic field undergoes the magnetocaloric heating effect and heats up.

The thermal exchange fluid that runs through the magnetocaloric element 4a is subjected to this heating and is thus heated to a temperature $\theta 11$ (stage 1 cycle 1 temperature) higher than the initial temperature $\theta 01$.

The thermal exchange fluid is transported towards the calories exchanger 7, which transfers the calories into the ambient environment.

Stage 2—Cycle 1:

After the electric pulse 9a, the electromagnet 2a is no longer fed electrically and no longer generates any magnetic field.

The magnetocaloric element 4a continues to heat up, as it is subjected to the inertia of the magnetocaloric heating effect.

The thermal exchange fluid that runs through the magnetocaloric element 4a thus continues to be heated to a temperature $\theta 21$ (stage 2 cycle 1 temperature) higher than the temperature $\theta 11$ and which corresponds to the maximum temperature of the thermal exchange fluid during this cycle 1.

The thermal exchange fluid is transported towards the calories exchanger 7, which transfers the calories towards the ambient environment.

Stage 3—Cycle 1:

The inertia of the magnetocaloric heating effect stops.

The magnetocaloric element 4a, subjected to the absence of a magnetic field, undergoes the magnetocaloric cooling effect and cools down.

The thermal exchange fluid that runs through the magnetocaloric element 4a is subjected to its cooling and is thus cooled down to a temperature $\theta 31$ (stage 3 cycle 1 temperature) lower than the temperature $\theta 21$.

The thermal exchange fluid is transported towards the calories exchanger 7, which transfers the calories towards the ambient environment.

When:

the timing means detect that the time interval elapsed since the preceding electric pulse 9a, or the thermal sensor 10 detects that the difference between the temperatures $\theta 31$ and $\theta 21$ or $\theta 11$ or $\theta 01$ of the thermal exchange fluid, is equal or lower than the commutation set point C1, the means of commutation 11 switch over and connect the magnetocaloric element 4a to the frigories exchanger 8.

Stage 4—Cycle 1:

The magnetocaloric element 4a continues to cool down.

The thermal exchange fluid that runs through the magnetocaloric element 4a continues to be cooled down to a temperature $\theta 41$ (stage 4 cycle 1 temperature) lower than the temperature $\theta 01$ that corresponds to the initial temperature of the thermal exchange fluid during this cycle 1.

The thermal exchange fluid is transported towards the frigories exchanger 8, which transfers the frigories towards the ambient environment.

When:

the timing means detect that the time elapsed since the preceding electric pulse 9a, or the thermal sensor 10 detects that the difference between the temperatures $\theta 41$ and $\theta 31$ or $\theta 01$ or $\theta 11$ or $\theta 21$ of the thermal exchange fluid, is equal or higher than the pulse set point I1, the control unit generates a new electric pulse 9a, which feeds the electromagnet 2a, and this electric pulse 9a may be appreciably similar to the initial electric pulse 9a or different depending on the requirements.

Simultaneously in this example, the means of commutation 11 connect the magnetocaloric element 4a to the calories exchanger 7 once again. It is evident that this commutation may be slightly shifted in time, performed in a stage 5, so as to connect the magnetocaloric element 4a to the calories exchanger 7 only when the thermal exchange fluid, under the influence of the new electric pulse 9a and the magnetic field, reaches a certain temperature.

The pulse set points In are set so that the ratio T/t of the frequency T between two electric pulses 9a over the duration t of the electric pulse 9a in question, ranges between 10 and 100,000, and with a value preferably higher than 1,000.

One then moves on to cycle 2.

The following operating cycles are appreciably similar to the first cycle and proceed as follows for the thermal exchange fluid:

Stage 1—Cycle n:

During the electric pulse 9a, heating of the thermal exchange fluid to a temperature $\theta 1n$ (stage 1 cycle in progress temperature), higher than the temperature $\theta 4n-1$ (stage 4 previous cycle temperature) but lower than the temperature $\theta 1n-1$ (stage 1 previous cycle temperature). Transfer of the calories via the calories exchanger 7.

Stage 2—Cycle n:

After the electric pulse 9a, under the inertia of the magnetocaloric heating effect, heating of the thermal exchange fluid to a temperature $\theta 2n$ (stage 2 cycle in progress temperature) higher than the temperature $\theta 1n$ (stage 1 cycle in progress temperature) that corresponds to the maximum temperature of the thermal exchange fluid during this cycle, but lower than the temperature $\theta 2n-1$ (stage 2 previous cycle temperature) that corresponds to the maximum temperature of the thermal exchange fluid during the previous cycle. Transfer of the calories via the calories exchanger 7.

Stage 3—Cycle n:

At the end of the inertia of the magnetocaloric heating effect, magnetocaloric cooling effect. Cooling of the thermal exchange fluid to a temperature $\theta 3n$ (stage 3 cycle in progress temperature) lower than the temperature $\theta 2n$ and lower than the temperature $\theta 2n-1$ (stage 2 previous cycle temperature). Transfer of the calories via the calories exchanger 7.

Detection of the commutation set point In and commutation to connect the magnetocaloric element 4a to the frigories exchanger 8.

Stage 4—Cycle n:

Magnetocaloric cooling effect, cooling of the thermal exchange fluid to a temperature $\theta 4n$ (stage 4 cycle in progress temperature) lower than the temperature $\theta 0n$ and which corresponds to the initial temperature of the thermal exchange fluid of this cycle n. Transfer of the frigories via the frigories exchanger 8.

Detection of the pulse set point In and feeding of the electromagnet 2a via a new electric pulse 9a.

Simultaneously or not, commutation to connect the magnetocaloric element 4a to the calories exchanger 7.

In "cooling" mode, the maximum temperatures "upper T" that correspond to $\theta 2n$ and minimum temperatures "T minimum" that correspond to $\theta 4n$, of the thermal exchange fluid, are increasingly low. Consequently, the average temperature "T average" of the thermal exchange fluid is also increasingly low, hence a cooling capacity and an effectiveness of the device 1a and of the method that increase progressively with the operating cycles until the minimum cooling temperature "T Low" of the magnetocaloric element 4a is reached, at which point the thermal exchange fluid's temperature becomes stabilized.

In "heating" mode illustrated by the curves on FIG. 2B, the process breaks up into several successive cycles appreciably similar to the previous ones. This method is different from the previous one in that the commutation and pulse set point values Cn and In are different from the previous ones and selected so as to obtain the following successive stages:

Cycle 1 (Startup):

Preparation: The means of commutation 11 are positioned so that the magnetocaloric element 4a is connected to the calories exchanger 7.

Startup:

The electromagnet 2a is fed with an electric pulse 9a of intensity I, which generates a magnetic field in the electromagnet 2a, which ranges between 0.05 Tesla and 10 Teslas, and with a value preferably higher than 2 Teslas, of duration t that ranges between $10^{-9}$ second and 60 seconds and with a value preferably lower than $10^{-2}$ second.

Cycle n:

Stage 1—Cycle n:

During the electric pulse 9a, heating of the thermal exchange fluid to a temperature $\theta 1n$ (stage 1 cycle in progress temperature), higher than the initial temperature $\theta 0$ or than the temperature $\theta 4n-1$ (stage 4 previous cycle temperature) but higher than the temperature $\theta 1n-1$ (stage 1 previous cycle temperature). Transfer of the calories via the calories exchanger 7.

Stage 2—Cycle n:

After the electric pulse 9a, heating of the thermal exchange fluid under the inertia of the magnetocaloric heating effect, to a temperature $\theta 2n$ (stage 2 cycle in progress temperature) higher than the temperature $\theta 1n$ (stage 1 cycle in progress temperature) that corresponds to the maximum temperature of the thermal exchange fluid during this cycle n, but lower than the temperature $\theta 2n+1$ (stage 2 following cycle temperature) that corresponds to the maximum temperature of the thermal exchange fluid during the following cycle. Transfer of the calories via the calories exchanger 7.

Stage 3—Cycle n:

At the end of the inertia of the magnetocaloric heating effect, magnetocaloric cooling effect. Cooling of the thermal exchange fluid to a temperature $\theta 3n$ (stage 3 cycle in progress temperature) lower than the temperature $\theta 2n$ and lower than the temperature $\theta 2n+1$ (stage 2 following cycle temperature). Transfer of the calories via the calories exchanger 7.

Detection of the commutation set point In and commutation to connect the magnetocaloric element 4a to the frigories exchanger 8.

Stage 4—Cycle n:

Magnetocaloric cooling effect, cooling of the thermal exchange fluid to a temperature $\theta 4n$ (stage 4 cycle in progress temperature) higher than the temperature $\theta 0n$ and which corresponds to the initial temperature of the thermal exchange fluid of this cycle n. Transfer of the frigories via the frigories exchanger 8.

Detection of the pulse set point In and feeding of the electromagnet 2a via a new electric pulse 9a. Simultaneously or not, commutation to connect the magnetocaloric element 4a to the calories exchanger 7.

In "heating" mode, the maximum temperatures "upper T" that correspond to $\theta 2n$ and minimum temperatures $\theta$"T minimum" that correspond to $\theta 4n$, of the thermal exchange fluid, are increasingly high. Consequently, the average temperature "T average" of the thermal exchange fluid is also increasingly high, hence a heating capacity and an effectiveness of the device 1a that increase progressively with the operating cycles until the maximum heating temperature "T High" of the magnetocaloric element 4a is reached, at which point the thermal exchange fluid's temperature becomes stabilized.

BEST WAY TO ACHIEVE THE INVENTION

Figure 3:
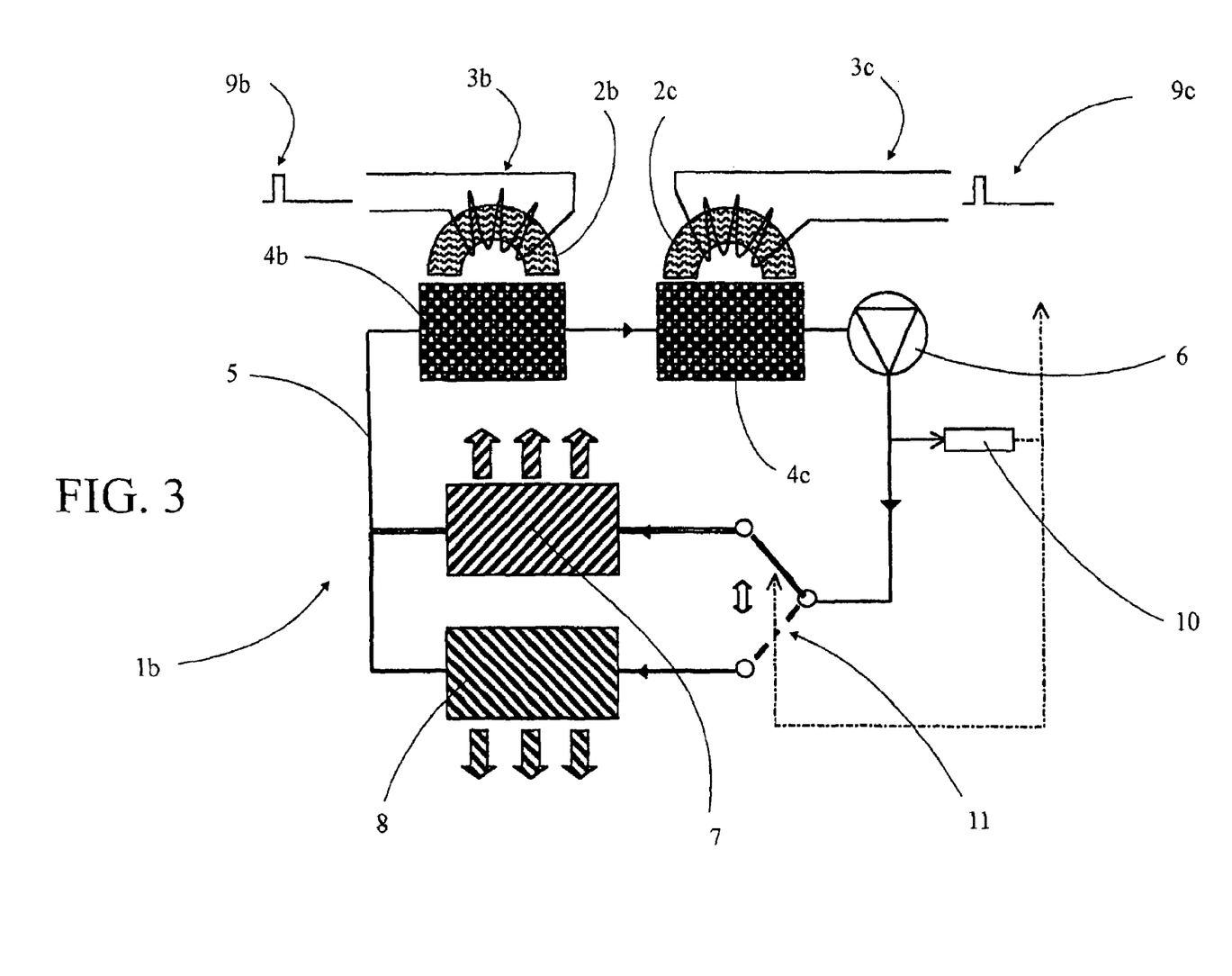
FIG. 3 is a schematic view of a first variant of the device according to the invention.

The device 1b on FIG. 3 is appreciably similar to the previous one. The difference lies in the fact that it comprises two magnetocaloric elements 4b, 4c, interconnected via the serial circuit 5 for thermal exchange fluid, with these magnetocaloric elements 4b, 4c potentially having appreciably similar or different magnetocaloric characteristics. The magnetocaloric elements 4b, 4c can also be interconnected in parallel or as a serial/parallel combination. It is also possible to envisage groups of magnetocaloric elements, with these groups being interconnected serially, in parallel or as a serial/parallel combination. The device 1b and the method are thus easily modifiable.

Each magnetocaloric element 4b, 4c is stressed by an electromagnet 2b, 2c connected to a separate power supply 3b, 3c, with these power supplies 3b, 3c controlled by one or more control units (not represented). It is thus possible to separately generate electric pulses 9b, 9c for each electromagnet 2b, 2c, simultaneously or successively, with or without an overlap period for these electric pulses 9b, 9c.

Figure 4:
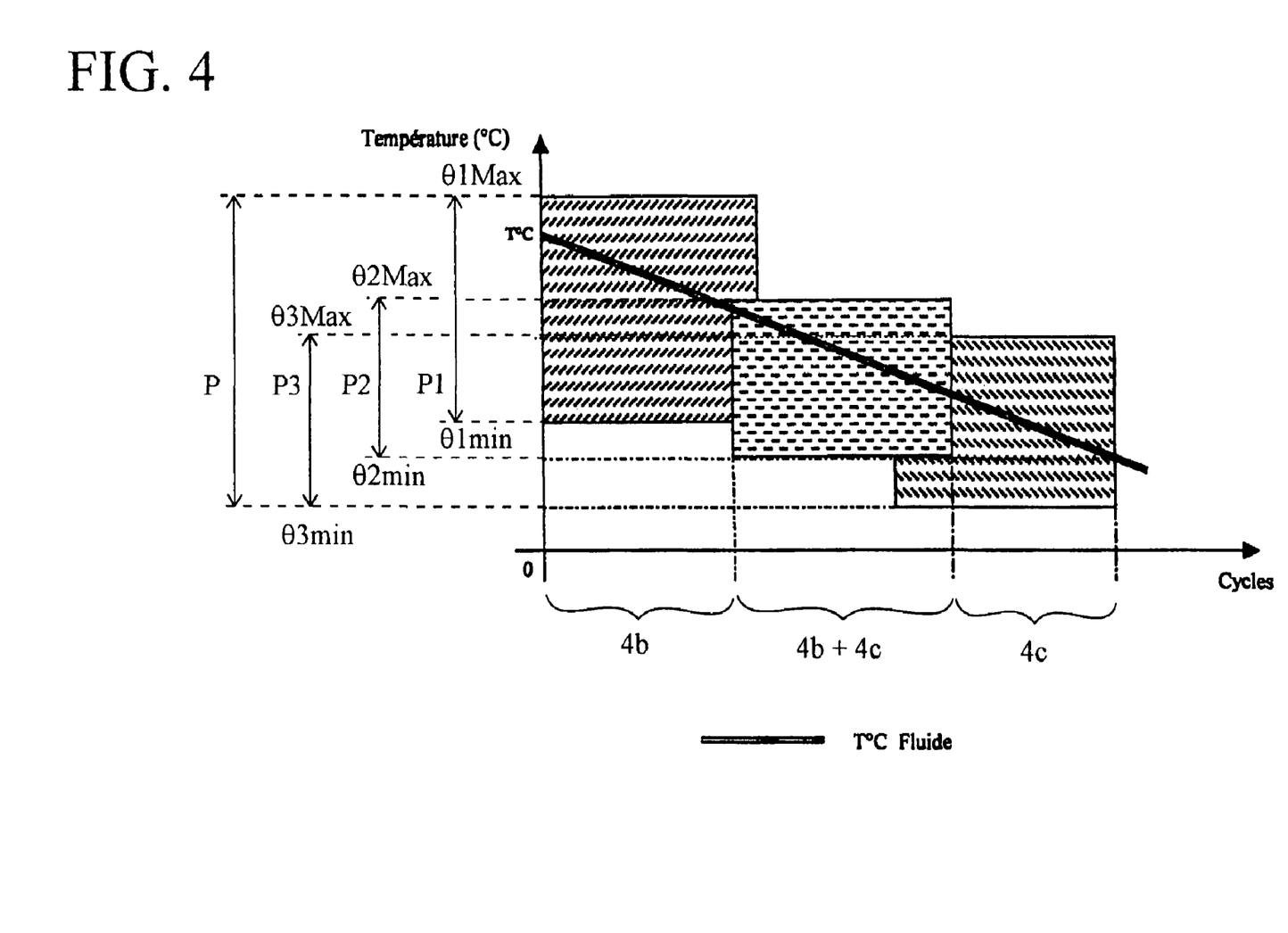
FIG. 4 is a curve illustrating one operating mode of the device represented on FIG. 3.

This configuration allows to combine the magnetocaloric properties of several magnetocaloric elements 4b, 4c, which is particularly advantageous when they are different. The operation of such a device 1b is described in reference to the graph on FIG. 4, which illustrates in the form of hatched areas the temperature ranges P1, P2, P3 accessible by using successively:

a first magnetocaloric element 4b on its own to obtain the temperature range P1 found between $\theta 1$ Max and $\theta 1$ min, a first magnetocaloric element 4b and a second magnetocaloric element 4c simultaneously to obtain the temperature range P2 found between $\theta 2$ Max and $\theta 2$ min, the second magnetocaloric element 4c on its own to obtain the temperature range P3 found between $\theta 3$ Max and $\theta 3$ min.

Thus, by combining the different magnetocaloric properties of the first and second magnetocaloric elements, it is possible to cover a very significant global temperature range P between $\theta 1$ Max and $\theta 3$ min.

Figure 5:
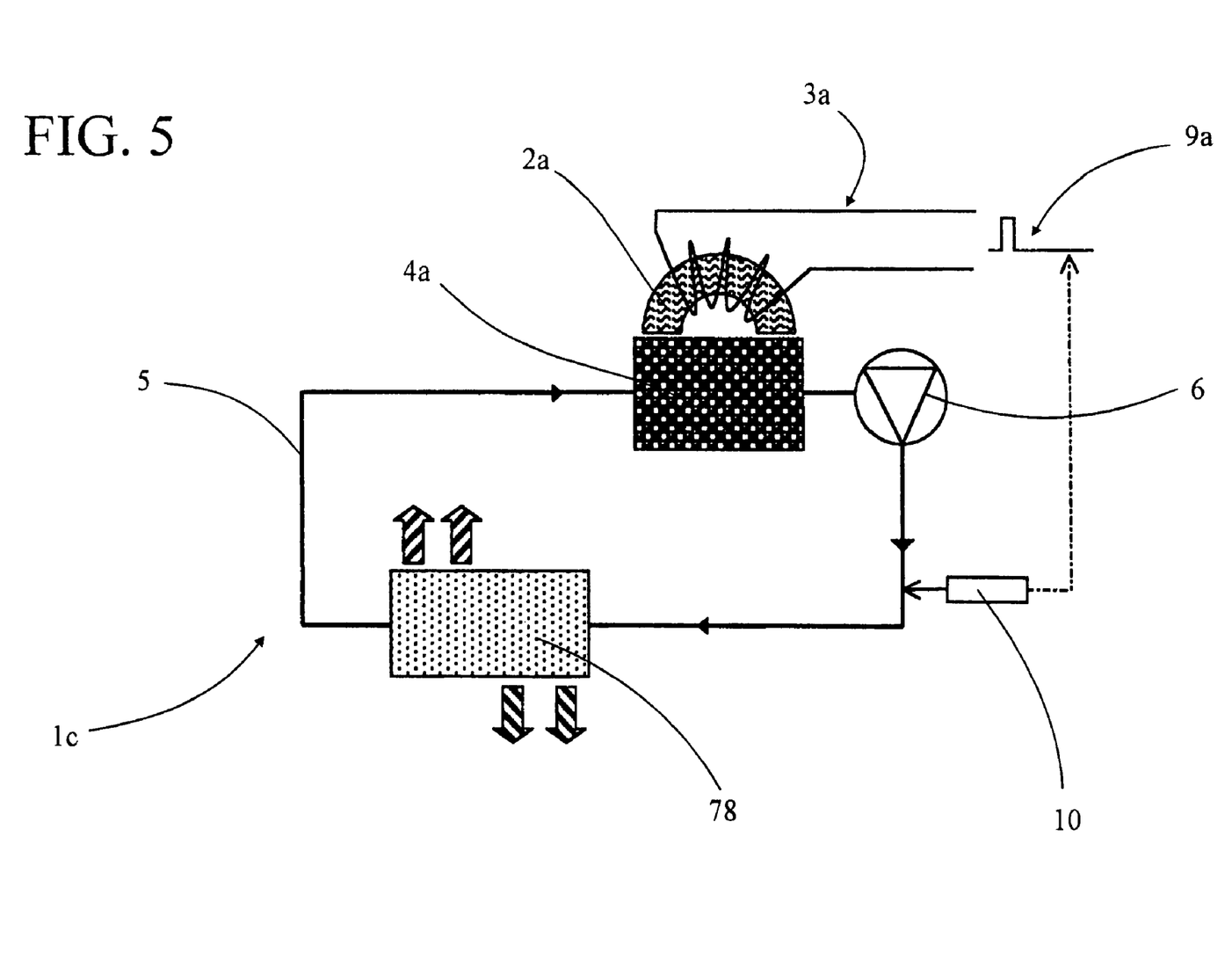
FIG. 5 is a schematic view of a second variant of the device according to the invention.

The device 1c on FIG. 5 is appreciably similar to the device on FIG. 1. The difference lies in the fact that it comprises only one "mixed" heat exchanger 78 to successively transfer the calories and the frigories.

Figure 6A:
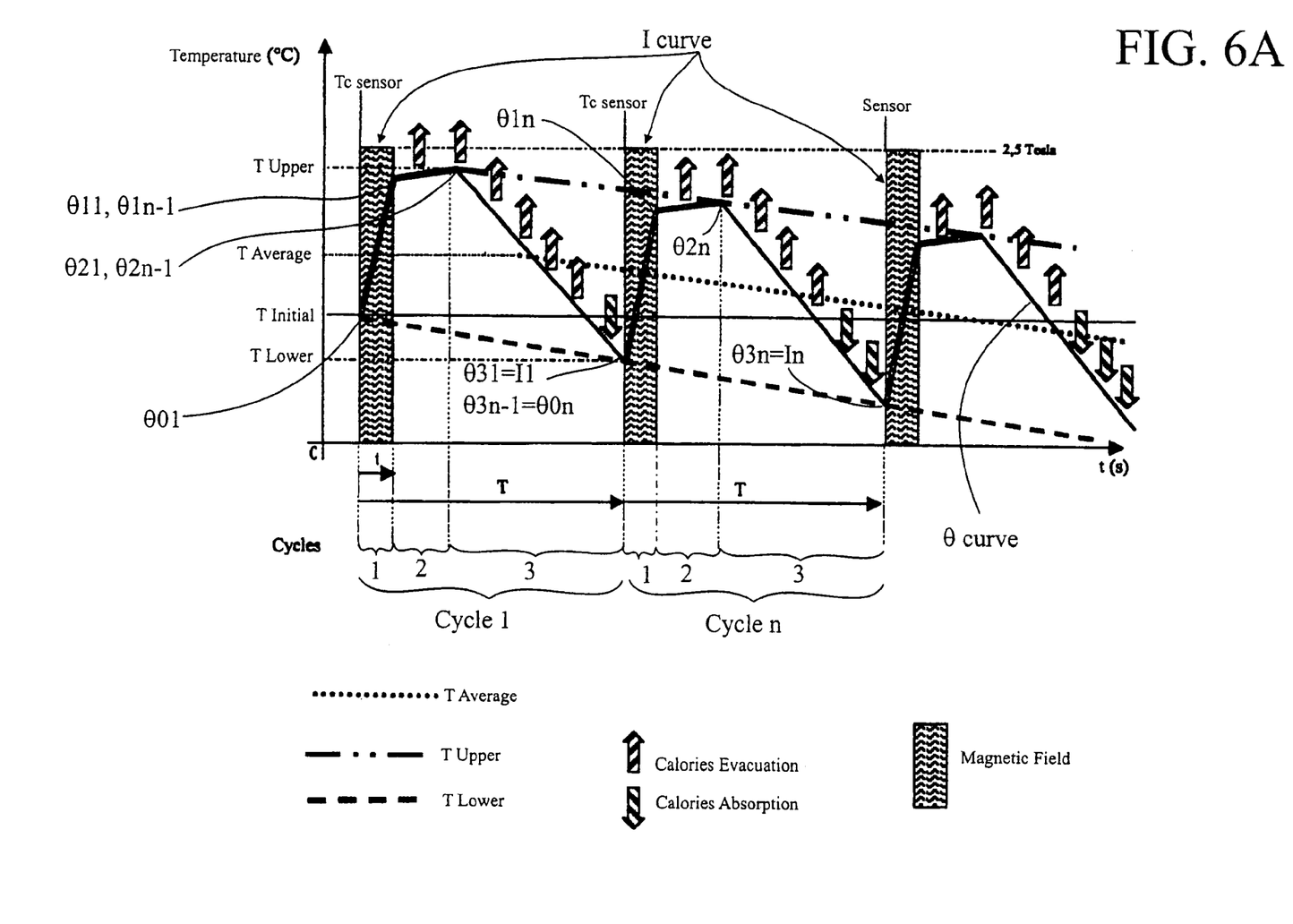
FIGS. 6A and 6B are curves illustrating the operation of the device represented on FIG. 5 according to the heating and cooling modes respectively.
Figure 6B:
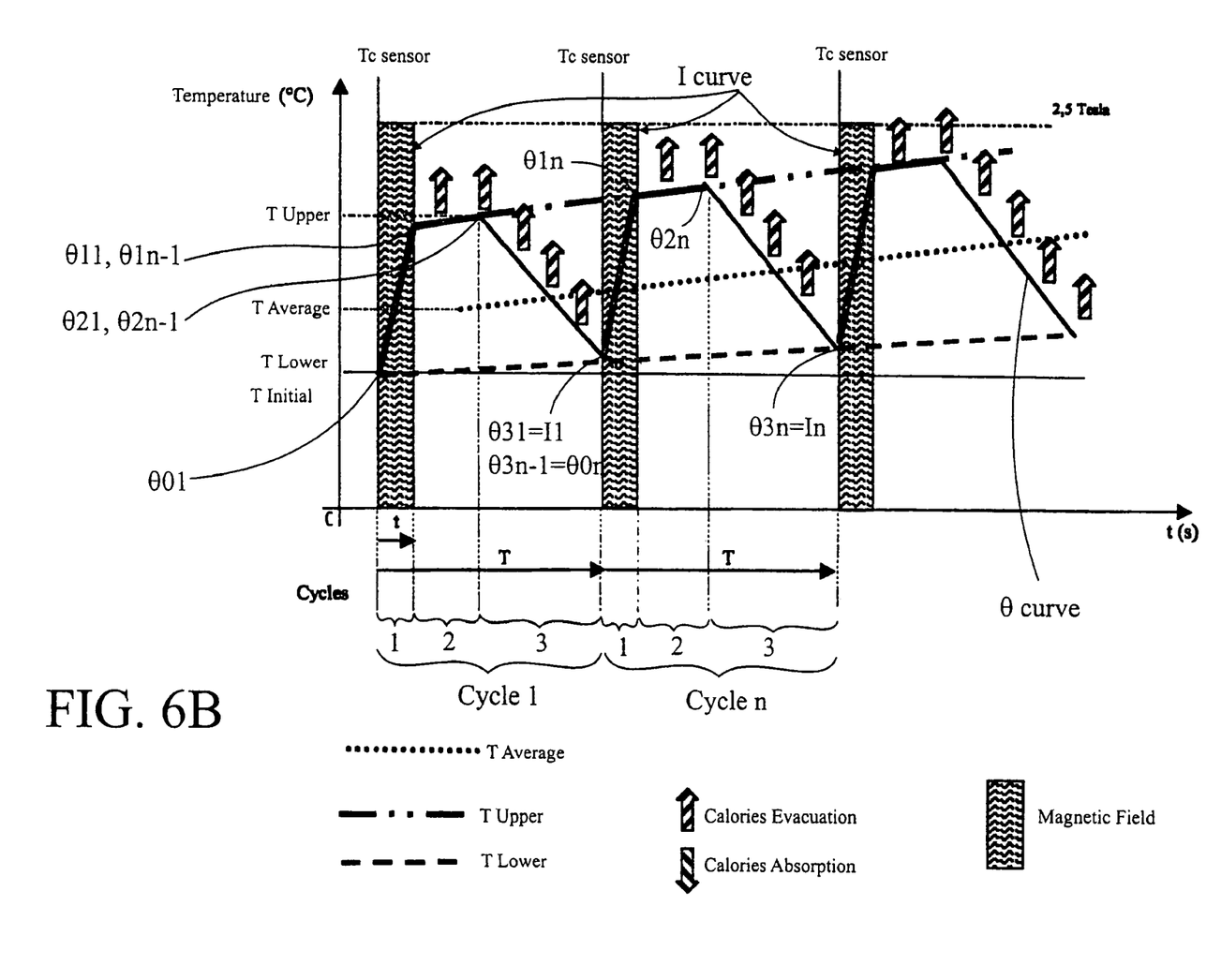

The process that uses this device 1c is described in reference to the pulse and temperature curves "I curve" and "$\theta$ curve" of the thermal exchange fluid on FIGS. 6A and 6B, respectively according to the "cooling" and "heating" modes. This process is appreciably similar to that of the device 1a on FIG. 1 illustrated by FIGS. 2A and 2B.

The operation in "cooling" mode illustrated on FIG. 6A differs mainly from that on FIG. 2A in that, since there is only one heat exchanger 78, there is no commutation and the heat exchanger 78 remains permanently connected to the magnetocaloric element 4a to successively transfer the calories then the frigories. Hence the operation only comprises the following three stages for each cycle n:

Stage 1—Cycle n:

Electric pulse 9a, heating of the thermal exchange fluid to a temperature $\theta 1n$ (stage 1 cycle in progress temperature), higher than the initial temperature $\theta 0n$ or than the temperature $\theta 3n-1$ (stage 3 previous cycle temperature) and higher than the temperature $\theta 1n-1$ (stage 1 previous cycle temperature). Transfer of the calories via the heat exchanger 78.

Stage 2—Cycle n:

After the electric pulse 9a, heating of the thermal exchange fluid under the inertia of the magnetocaloric heating effect, to a temperature $\theta 2n$ (stage 2 cycle in progress temperature) higher than the temperature $\theta 1n$ (stage 1 cycle in progress temperature) that corresponds to the maximum temperature of the thermal exchange fluid during this cycle n, and higher than the temperature $\theta 2n+1$ (stage 2 following cycle temperature) that corresponds to the maximum temperature of the thermal exchange fluid during the following cycle. Transfer of the calories via the heat exchanger 78.

Stage 3—Cycle n:

Magnetocaloric cooling effect at the end of the inertia of the magnetocaloric heating effect, magnetocaloric cooling effect. Cooling of the thermal exchange fluid to a temperature $\theta 3n$ (stage 3 cycle in progress temperature) lower than the temperature $\theta 0n$ that corresponds to the initial temperature of the thermal exchange fluid of this cycle n. Transfer of the calories followed by transfer of the frigories via the heat exchanger 78. Detection of the pulse set point In and feeding of the electromagnet 2a via a new electric pulse 9a.

The operation in "heating" mode illustrated on FIG. 6B differs from that on FIG. 2B in that the magnetocaloric cooling effect is not used. Indeed, the pulse parameter In is set so that the electric pulse 9a is generated before the temperature $\theta 3n$ becomes lower than the temperature $\theta 0n$. Hence the operation only comprises the following three stages for each cycle n Stage 1—Cycle n:

Electric pulse 9a, heating of the thermal exchange fluid to a temperature $\theta 1n$ (stage 1 cycle in progress temperature), higher than the initial temperature $\theta 0n$ or than the temperature $\theta 3n-1$ (stage 3 previous cycle temperature) but lower than the temperature $\theta 1n-1$ (stage 1 previous cycle temperature). Transfer of the calories via the heat exchanger 78.

Stage 2—Cycle n:

After the electric pulse 9a, heating of the thermal exchange fluid under the inertia of the magnetocaloric heating effect, to a temperature $\theta 2n$ (stage 2 cycle in progress temperature) higher than the temperature $\theta 1n$ (stage 1 cycle in progress temperature) that corresponds to the maximum temperature of the thermal exchange fluid during this cycle n, but lower than the temperature $\theta 2n+1$ (stage 2 following cycle temperature) that corresponds to the maximum temperature of the thermal exchange fluid during the following cycle. Transfer of the calories via the heat exchanger 78.

Stage 3—Cycle n:

Magnetocaloric cooling effect at the end of the inertia of the magnetocaloric heating effect, magnetocaloric cooling effect. Cooling of the thermal exchange fluid to a temperature $\theta 3n$ (stage 3 cycle in progress temperature) higher than the temperature $\theta 0n$ that corresponds to the initial temperature of the thermal exchange fluid of this cycle n. Transfer of the calories followed by transfer of the frigories via the heat exchanger 78. Detection of the pulse set point In and feeding of the electromagnet 2a via a new electric pulse 9a.

Generally, in these examples, the magnetic element 2a-c and the magnetocaloric element 4a-c are fixed in relation to one another. It is nevertheless possible to envisage them as mobile. It is also possible to use a higher number of magnetocaloric elements 4a-c and/or electromagnets 2a-c and/or heat exchangers 7, 8, 78.

According to other variants of embodiment not represented, it is possible to use several heat exchangers 7, 8, 78 or groups of heat exchangers connected to the circuit of thermal exchange fluid in serially, in parallel or as a serial/parallel combination. The device 1a-c and the process are thus easily modifiable.

POSSIBILITIES FOR INDUSTRIAL APPLICATIONS

This device 1a-c and this method can be used in any industrial or domestic cooling, heating, air-conditioning, regulation application.

This description clearly highlights the fact that the device 1a-c and the process according to the invention allow to satisfy the intended objectives. In particular they allow to overcome any tightness problem inherent to devices that comprise magnetocaloric elements and/or electromagnets or other magnetic elements mobile in relation to one another.

Moreover, they follow a very simple design and do not require any means of actuation in order to move the magnetocaloric elements 4a-c and/or the electromagnets 2a-c. They consequently use low amounts of energy and require a limited number of parts and mechanical elements hence reduced maintenance requirements and limited breakdown risks.

The present invention is not limited to the embodiment examples described but can be extended to any modification and variant obvious to a person skilled in the art while remaining within the scope of protection defined by the attached claims.

The invention claimed is:

1. A device (1a-c) for the generation of thermal units using magnetocaloric material, the device comprising:
   at least one magnetic element (2a-c) intended to generate a magnetic field,
   at least one magnetocaloric element (4a-c) intended to be alternatively subjected to the magnetic field in order to generate calories and frigories,
   at least one circuit (5) for circulating a thermal exchange fluid flowing through the magnetocaloric element (4a-c) to recover at least part of at least one of the calories and frigories that the magnetocaloric element (4a-c) emits,
   the circuit (5) being coupled to means for circulation (6) of the thermal exchange fluid and to at least one heat exchanger (7, 8, 78) for transfer of at least part of at least one of the calories and frigories recovered by the thermal exchange fluid,
   wherein the magnetic element is an electromagnet (2a-c) coupled to at least one power supply (3a-c) controlled by at least one control unit (20) for generating electric pulses (9a-c) and creating an impulsive magnetic field, with the electric pulses (9a-c) having an intensity (I), duration (t) and frequency (T) triggered as a function of at least one predetermined pulse parameter, and the device comprising at least one thermal sensor (10) for determining the temperature of the thermal exchange fluid, and said fluid temperature defining at least one pulse parameter.

2. The device (1a, 1b) according to claim 1, wherein the device includes mains of recovery which comprises at least two heat exchangers (7, 8) connected to the circuit (5) one of serially, in parallel and as a serial/parallel combination.

3. The device (1a, 1b) according to claim 2, wherein the means of recovery comprise at least one heat exchanger for calories (7) set up to transfer the calories and at least one heat exchanger for frigories (8) set up to transfer the frigories, with the two heat exchangers (7, 8) coupled to means of commutation (11) controlled by a control unit set up to successively connect each heat exchanger (7, 8) to the magnetocaloric element (4a-c) as a function of at least one predetermined commutation parameter.

4. The device (1a-c) according to claim 1, wherein the control unit is set up so that the frequency (T) ranges between 60 seconds and $1/150^{th}$ of a second.

5. The device (1a-c) according to claim 1, wherein the control unit is set up so that the frequency (T)/duration (t) ratio ranges between 10 and 100,000.

6. The device (1a-c) according to claim 1, wherein the control unit is set up so that the intensity (I) generates, in the magnetic element, a magnetic field that ranges between 0.05 Tesla and 10 Teslas.

7. The device (1a-c) according to claim 1, wherein the control unit comprises means for the adjustment of at least one of the pulse parameters selected within the group that includes the duration (t), the frequency (T), the intensity (I).

8. A device (1a-c) for the generation of thermal units using magnetocaloric material, the device comprising:
   at least one magnetic element (2a-c) intended to generate a magnetic field,
   at least one magnetocaloric element (4a-c) intended to be alternatively subjected to the magnetic field in order to generate calories and frigories,
   at least one circuit (5) for circulating a thermal exchange fluid, of which at least a portion is placed in an immediate vicinity of flowing through the magnetocaloric element (4a-c) to recover at least part of at least one of the calories and frigories that the magnetocaloric element (4a-c) emits;
   the circuit (5) being coupled to means for circulation (6) of the thermal exchange fluid and to at least one heat exchanger (7, 8, 78) for transfer of at least part of at least one of the calories and frigories recovered by the thermal exchange fluid;
   wherein the magnetic element is an electromagnet (2a-c) coupled to at least one power supply (3a-c) controlled by at least one control unit (20) for generating electric pulses (9a-c) and create an impulsive magnetic field, with the electric pulses (9a-c) having an intensity (I), duration (t) frequency (T) triggered as a function of at least one predetermined pulse parameter and the device comprising at least one thermal sensor (10) for determining the temperature of the thermal exchange fluid, and said fluid temperature defining at least one pulse parameter; and
   a means set up to determine the time interval elapsed since one of a preceding commutation and electric pulse (9a-c), with this time interval defining at least one of a commutation and pulse parameter.

9. The device (1a-c) according to claim 1, wherein the control unit comprises means for the adjustment of at least one of the predetermined commutation and pulse parameter.

10. The device (1a-c) according to claim 1, wherein the means of recovery comprise at least a mixed exchanger (78) set up to transfer the calories and the frigories.

11. The device (1b) according to claim 1, wherein the device comprises at least two magnetocaloric elements (4b, 4a) interconnected at least one of in series, in parallel and as a serial/parallel combination.

12. The device (1b) according to claim 11, wherein the magnetocaloric elements (4b, 4a) have different magnetocaloric characteristics.

13. The device (1b) according to claim 11, wherein the device comprises at least two electromagnets (2b, 2c), each one associated to a magnetocaloric element (4b, 4a) and at least two power supplies (3b, 3c) set up to separately feed the electromagnets (2b, 2c) electrically.

14. The device (1a-c) according to claim 1, wherein a core of the magnetic element (2a-c) is made of a high remanence magnetic material.

15. The device (1a-c) according to claim 1, wherein the magnetic element (2a-c) and the magnetocaloric element (4a-c) are fixed in relation to one another.

16. A method for generating thermal units using magnetocaloric material during which at least one magnetocaloric material element (4a-c) is subjected to a least one electromagnet (2a-c) fed with electric pulses to create an impulsive magnetic field and generate calories and frigories, wherein of an intensity (I), a duration (t) and a frequency (T) of the electric pulses (9a-c) are triggered as a function of at least one predetermined pulse parameter, the temperature of the thermal exchange fluid is determined and this fluid temperature is used as a pulse parameter; and the method comprising the steps of:
- coupling the electromagnet (2a-c) with at least one power supply (3a-c) controlled by at least one control unit (20) for generating the electric pulses (9a-c) to create the impulsive magnetic field;
- circulating the thermal exchange fluid through the magnetocaloric element (4a-c) in at least one circuit (5) of which at least a portion is placed in an immediate vicinity of the magnetocaloric element (4a-c);
- recovering, via the thermal exchange fluid, at least part of at least one of the calories and the frigories generated by the magnetocaloric element (4a-c);
- transferring, via at least one heat exchanger (7, 8, 78), at least part of at least one of the recovered calories and the frigories.

17. The method according to claim 16, further comprising the step of using at leas two heat exchangers which are connected to the aforesaid circuit (7, 8) one of serially, in parallel and as a serial/parallel combination.

18. The method according to claim 17, further comprising the step of using at least one calories exchanger (7) to transfer the calories and at least one frigories exchanger (8) to transfer the frigories, which are alternatively connected to the magnetocaloric element (4a-c) as a function of at least one predetermined commutation parameter.

19. The method according to claim 16, further comprising the step of adjusting at least one of the pulse parameters, selected within the group, which includes the frequency (T) so that the frequency (T) ranges between 60 seconds and $1/150^{th}$ of a second, the frequency (T)/duration (t) ratio so that the ration ranges between 10 end 100,000, the intensity (I) so that the intensity (I) generates a magnetic field in the magnetic element, which ranges between 0.05 Tesla and 10 Teslas.

20. The method according to claim 16, further comprising the step of determining the time interval elapsed, since the preceding commutation and/or electric pulse (9a-c), and this time interval is used as commutation and/or pulse parameter.

21. The method according to claim 16, further comprising the step of using at least two magnetocaloric elements (4b, 4c) which have different magnetocaloric characteristics and which are interconnected one of serially, in parallel and as a serial/parallel combination.

22. The method according to claim 21, further comprising the step of using at least two electromagnets (2b, 2c), each one associated to a magnetocaloric element (4b, 4c), and at least two power supplies (3b, 3c), and n successive phases, a first magnetocaloric element (4b) is used on its own, then a first magnetocaloric element (4b) and a second magnetocaloric element (4c) are used simultaneously end finally, the second magnetocaloric element (4c) is used on its own so as to combine the magnetocaloric properties of the first and second magnetocaloric elements (4b, 4c).

* * * * *